United States Patent [19]

Hayashida et al.

[11] Patent Number: 4,927,885

[45] Date of Patent: May 22, 1990

[54] POLYPROPYLENE RESIN COMPOSITIONS

[75] Inventors: Suetou Hayashida, Noda; Kyoichiro Kimura, Ichihara; Eiji Takahashi, Chiba, all of Japan

[73] Assignee: Maruzen Petrochemical Co., Ltd., Tokyo, Japan

[21] Appl. No.: 253,847

[22] Filed: Oct. 5, 1988

[30] Foreign Application Priority Data

Oct. 14, 1987 [JP] Japan .................. 62-257382

[51] Int. Cl.$^5$ .................. C08L 23/12; C08L 45/00; C08L 25/08
[52] U.S. Cl. .................. 525/211; 525/216; 525/192; 525/196
[58] Field of Search .................. 525/211, 216, 192

[56] References Cited

U.S. PATENT DOCUMENTS

| | | | |
|---|---|---|---|
| T917,008 | 12/1973 | Fanjans | 525/216 |
| 2,319,271 | 5/1943 | Soday | 260/80 |
| 3,666,836 | 5/1972 | John | 260/897 A |
| 3,674,536 | 7/1972 | Khelghatian et al. | 117/47 A |
| 3,926,878 | 12/1975 | Shimizu et al. | 260/27 EV |
| 3,937,762 | 2/1976 | Nahmias et al. | 525/216 |
| 3,985,833 | 10/1976 | Argurio et al. | 525/211 |
| 4,032,493 | 6/1977 | Pascual | 525/216 |
| 4,087,505 | 5/1978 | Sugimoto et al. | 525/216 |
| 4,105,837 | 8/1978 | Prosser | 526/26 |
| 4,124,550 | 11/1978 | Kobayashi et al. | 260/23.3 |
| 4,129,557 | 12/1978 | Kudo et al. | 526/283 |
| 4,228,266 | 10/1980 | Kudo et al. | 526/283 |
| 4,315,842 | 2/1982 | Tsuchiya et al. | 260/28.5 |
| 4,330,448 | 5/1982 | Iwata | 526/79 |
| 4,413,067 | 11/1983 | Tsuchiya et al. | 523/172 |
| 4,419,497 | 12/1983 | Tsuchiya et al. | 525/338 |
| 4,650,829 | 3/1987 | Bossaert et al. | 525/216 |
| 4,731,401 | 3/1988 | Moteki et al. | 525/211 |

FOREIGN PATENT DOCUMENTS

| | | |
|---|---|---|
| 1151379 | 7/1963 | Fed. Rep. of Germany . |
| 1420350 | 4/1969 | Fed. Rep. of Germany . |
| 1520425 | 4/1970 | Fed. Rep. of Germany . |
| 2000328 | 7/1970 | Fed. Rep. of Germany . |
| 2045115 | 4/1971 | Fed. Rep. of Germany . |
| 1745474 | 9/1971 | Fed. Rep. of Germany . |
| 2163525 | 7/1972 | Fed. Rep. of Germany . |
| 2345014 | 3/1975 | Fed. Rep. of Germany . |
| 2723904 | 3/1978 | Fed. Rep. of Germany . |
| 2932190 | 2/1980 | Fed. Rep. of Germany . |
| 39420 | 10/1977 | Japan . |
| 36938 | 8/1982 | Japan . |
| 58-185635 | 10/1983 | Japan .................. 525/216 |
| 1413013 | 11/1975 | United Kingdom . |
| 2032439 | 5/1980 | United Kingdom . |

OTHER PUBLICATIONS

Peintures 42, 1966, No. 5, S.353–382, Hochmolekularbericht.
Derwent Abstracts No. 85-15740/26, JP 60090734.
Derwent Abstracts No. 88-081849/12, JP 63035642.
Derwent Abstracts No. 49313 K/21, DE 31 44 912.
Patent Abstracts of Japan, C-425, 5/28/87 vol. 11, No. 167.
Patent Abstracts of Japan, C-356, 6/25/86 vol. 10.

*Primary Examiner*—Carman J. Seccuro
*Attorney, Agent, or Firm*—Frishauf, Holtz, Goodman & Woodward

[57] ABSTRACT

Polypropylene resin compositions suitable for producing polypropylene films with excellent properties are disclosed. The compositions can provide polypropylene films having very excellent transparency, excellent heat-sealability and good anti-blocking property. Such characteristics are essential requirements for packing films. The polypropylene resin compositions comprise 70 to 99 parts by weight of polypropylene and 1 to 30 parts by weight of a specific hydrogenated petroleum resin. The hydrogenated petroleum resin can easily be prepared industrially from valueless by-products of oil and petrochemical industries, such as $C_5$ fraction and $C_9$ fraction by-produced in naphtha steam cracking process.

18 Claims, No Drawings

POLYPROPYLENE RESIN COMPOSITIONS

BACKGROUND OF THE INVENTION

1. Field of the Invention

This invention relates to polypropylene resin compositions having improved properties. More particularly, this invention relates to polypropylene resin compositions having far superior transparency, excellent antiblocking property and good heat-sealability (ability to form heat-sealing), which is obtainable by compounding a hydrogenated resin of a thermally copolymerized resin of cyclopentadienes and aromatic hydrocarbons to polypropylene.

More specifically, the invention is to provide polypropylene resin compositions to which heat-sealability and anti-blocking property, which are not inherent in poly-propylene films, are provided without impairing the excellent mechanical characteristics which are inherent in polypropylene films, and yet in which an excellent transparent inherent in polypropylene films is further improved.

Polypropylene films possess extremely superior mechanical characteristics, impermeability to gases and moisture, transparency, and glossiness. Because the above-mentioned characteristics are similar to those of cellophane, polypropylene films have wide packing uses. However, there is a problem that they are inferior to cellophane with respect to heat-sealability and transparency.

2. Description of the Prior Art

Compounding natural resins, petroleum resins, or their hydrogenated materials has been proposed as a means for providing polypropylene film with sufficient properties for packing uses, e.g. heat-sealability and anti-blocking property (for example, Japanese Patent Publication Nos. Sho 52(1977)-39420 and Sho 57(1982)-36938). As the resins to be compounded to polypropylene, natural resins such as terpene-type resins and rosin-type resins, and aliphatic or aromatic-type petroleum resins are used, and especially hydrogenated products of these resins are highly appraised.

However, these resins to be compounded into polypropylene films still have disadvantages to be improved, and thus there are no resins which satisfy with a good balance of all the characteristics required of packing uses. For instance, natural resins are supplied only with uncertainty and are not constant in their quality. In addition, they are not economical. Aliphatic-type hydrogenated resins can provide superior transparency but low anti-blocking property. On the other hand, cyclopentadiene-type hydrogenated resins can provide excellent tensile strength, anti-blocking property and moisture-barrier-property, but in case of blending them with polypropylene they scarcely improve and even lower the transparency inherent in polypropylene films.

SUMMARY OF THE INVENTION

The present invention is to provide a solution to these problems mentioned above and other problems found in prior art with respect to polypropylene films by compounding specific type resins into polypropylene.

Accordingly, an object of this invention is to provide polypropylene resin compositions which can be formed into polypropylene films having excellent heat-sealability, anti-blocking property and mechanical properties, and at the same time having a further improved transparency.

Other objects of this invention will be apparent by the persons in the art from the detailed descriptions of this invention given hereunder.

Specifically, the polypropylene resin composition of this invention has, as its feature, formulating into 70 to 99 parts by weight of polypropylene, 1 to 30 parts by weight of a hydrogenated resin of a thermal-copolymerization product of hydrocarbons and indenes. Compounding said hydrogenated resin into polypropylene provides superior heat-sealability, anti-blocking property, and tensile strength at the same time, and further greatly improved transparency to the polypropylene films.

We have undertaken extensive studies on petroleum resins to be compounded into polypropylene, and found that a resin prepared by thermally copolymerizing 1 mole of cyclopentadienes and 0.06 to 0.6 mole of one or more kinds of aromatic hydrocarbons so that norbornene units/cyclopentene units ratio (ND/CD) in the thermally copolymerized resin thus formed might not be higher than 0.55 and by hydrogenating this thermally copolymerized resin to give a degree of hydrogenation of not less than 98 %, resolves all the above-mentioned problems of polypropylene films. This finding has led to the completion of this invention.

Thus, the gist of this invention resides in a polypropylene resin composition comprising:

(A) 70 to 99 parts by weight of polypropylene and (B) 1 to 30 parts by weight of a hydrogenated resin, said hydrogenated resin being obtained by hydrogenation of a thermally copolymerized resin prepared from 1 mole of cyclopentadienes and 0.06 to 0.6 mole of one or more kinds of aromatic hydrocarbons selected from the group consisting of monovinyl aromatic hydrocarbons and indenes, wherein (a) the ratio of norbornene units relative to cyclopentene units (ND/CD), both derived from cyclopentadiene units contained in said thermally copolymerized resin, of said thermally copolymerized resin is not higher than 0.55, and (b) the degree of hydrogenation of said hydrogenated resin is not less than 98.0%.

DETAILED DESCRIPTION OF THE INVENTION

The term "polypropylene" used herein, which is one of the components of the composition of this invention covers not only polypropylene homopolymer but also copolymers of propylene with a small amount of other olefins such as ethylene, butenes, and the like. As stereospecific polypropylenes, such as isotactic and syndiotactic polypropylenes, those having melt index (MI) of between 0.5 and 10 are desirable.

A hydrogenated product of a thermally copolymerized resin of cyclopentadienes and aromatic hydrocarbons (such a hydrogenated product being hereinafter simply referred to as "hydrogenated resin"), which is the other component of the composition of this invention, can be obtained by the thermal copolymerization of cyclopentadienes and aromatic hydrocarbons, followed by hydrogenation of the copolymer according to a conventional method.

One of the raw materials of the hydrogenated resin used in this invention is cyclopentadienes. The cyclopentadienes include cyclopentadiene, its dimer, trimer and other oligomers, its alkyl substituted derivatives, as well as their mixtures. A cyclopentadiene fraction (CPD fraction) obtained from a steam cracking of naphtha or the like and containing cyclopentadienes of more than 30% by weight, preferably more than 50% by weight, are also available. A major portion of the components except cyclopentadienes in CPD fraction is inert saturated hydrocarbons, but inclusion of olefinic monomers which can copolymerize with said cyclic dienes is acceptable. These olefinic monomers may include aliphatic olefins such as isoprene, piperylene, butadiene and the like, and alicyclic olefins such as cyclopentene and the like. When considering the purpose of this invention, a lower content of these olefins is preferable, though the content up to 10% by weight based on the amount of cyclopentadienes is acceptable.

Aromatic hydrocarbons which are another raw material of the hydrogenated resin of this invention includes monovinyl aromatic hydrocarbons and/or indenes. As examples of monovinyl aromatic hydrocarbons, styrene, o-, m-, and p-vinyl toluenes, α- and β-methyl styrenes, as well as their mixtures can be cited. As examples of indenes, indene, methyl indenes, ethyl indenes, and their mixtures can be cited. When a mixture of vinyl aromatic hydrocarbons and indenes are employed, the use of a so-called $C_9$ fraction by-produced from a steam cracking of naphtha or the like is advantageous from the industrial point of view. This $C_9$ fraction usually contains inert aromatic hydrocarbons, beside said aromatic hydrocarbons, i.e., monovinyl aromatic hydrocarbons and/or indenes. Reactive aromatic hydrocarbons, i.e., monovinyl aromatic hydrocarbons and/or indenes, have a molecular weight or an average molecular weight of 104 to 144. The reactive aromatic hydrocarbons are formulated in an amount of 0.06 to 0.6 mole per 1 mole of cyclopentadienes. If this amount exceeds 0.6 mole, the yield of the resultant resin becomes lower and the softening point of the resin becomes lower. On the other hand, if the amount is less than 06 mole, the effect of this invention cannot be sufficiently exhibited. In the calculation of cyclopentadienes, one mole of dicyclopentadiene is counted as 2 moles of cyclopentadiene and one mole of tricyclopentadiene is counted as 3 moles of cyclopentadiene.

The raw materials thus formulated are thermally copolymerized in the presence or absence of a solvent such as benzene, xylenes, n-hexane, or kerosene, at a temperature of 220° to 320° C., preferably at 240° to 300° C., desirably in an atmosphere of an inert gas such as nitrogen, for 0.1 to 10 hours, preferably for 0.2 to 6 hours under pressure sufficient to maintain the polymerization system in liquid phase. A solvent, when used, is added in such an amount to make the concentration of the reactive components in the system to about 30% or more. After the thermal copolymerization, a thermally copolymerized resin can be obtained by lowering the pressure and removing inert components, unreacted raw materials, and, if necessary, the solvent from the reaction mixture. Desirably however a second-stage thermal polymerization may be effected. The second-stage thermal polymerization can be conducted, preferably, as follows: That is, by maintaining the temperature of the system at 150° to 300° C. for 0.5 to 10 hours, preferably for 0.5 to 6 hours, under a pressure from a reduced pressure to an increased pressure. It is more preferable to conduct the second-stage thermal polymerization under a reduced pressure. This series of thermal polymerizations can be conducted either continuously or batchwise.

The ratio of norbornene units (ND) relative to cyclopentene units (CD), i.e., ND/CD, both derived from the cyclopentadiene units contained in the thermally copolymerized resin was determined by proton-nuclear magnetic resonance ($^1$H-NMR) from the ratio of hydrogen atoms existing on the norbornene ring double bond at 5.9 ppm and those existing on the cyclopentene ring double bond at 5.6 ppm. This ND/CD ratio can be controlled by the first stage polymerization conditions such as temperature and reaction time, and the second-stage polymerization conditions such as temperature, reaction time and pressure, and the proportion of cyclopentadienes and aromatic hydrocarbons in the feed. Such polymerization conditions and the proportion of the raw materials should be selected so as to give the ND/CD ratio of not higher than 0.55. If this ratio exceeds 0.55, it is difficult to improve the transparency of polypropylene film, even though the hydrogenated thermally copolymerized resin is compounded thereinto.

A hydrogenated resin used in this invention can be obtained by hydrogenating the thermally copolymerized resin by a conventional hydrogenation process, e.g. using a hydrogenation catalyst such as metals of Group VIII of Periodic Table, i.e., nickel, palladium, cobalt, or the like, in the presence of a solvent such as alicyclic hydrocarbons, i.e., cyclohexane or the like at temperature of 150° to 300° C. and under hydrogen pressure of 10 to 150 Kg/cm². In order to obtain a polypropylene film with excellent transparency, the degree of hydrogenation should be at least 98.0%, and preferably not less than 98.5%. Here, the degree of hydrogenation is defined as the reduction percentage of ultra-violet (UV) absorbance at about 265 nm of the resin as determined by the following formula.

$$\text{Degree of Hydrogenation (\%)} = \frac{\epsilon_0 - \epsilon}{\epsilon_0} \times 100$$

wherein $\epsilon_0$ is the UV absorbance at about 265 nm of the resin before hydrogenation and $\epsilon$ is the corresponding UV absorbance of the resin after hydrogenation. The measurement of the UV absorbance was carried out according to a conventional method.

When this degree of hydrogenation is less than 98.0%, the resulting resin has a poor compatibility with polypropylene, giving, in most of the cases, only insufficient improvement in, or in some cases, even worse, transparency of the polypropylene film.

Therefore, in order to produce a desired polypropylene resin composition of this invention, it is essential that norbornene units/cyclopentene units ratio (ND/CD), both derived from cyclopentadiene units constituting the thermally copolymerized resin, is not higher than 0.55 and, at the same time, the degree of hydrogenation of the hydrogenated resin is not less than 98.0%. Also, it is desirable that the hydrogenated resin used in this invention has a softening point (measured by ring and ball method) of 80° to 155° C. When a hydrogenated resin with a softening point of higher than 155° C. is used, it would be difficult to obtain the meritorious effect of this invention, because polypropylene films often show low transparency. Also, it is undesirable to use a hydrogenated resin with a softening point of lower than 80° C., because polypropylene films will have lower mechanical properties, lower anti-blocking property and other undesirable properties.

The polypropylene resin composition of this invention can be obtained by blending, in a molten state, 70 to 99 parts by weight, preferably 70 to 95 parts by weight, of polypropylene and 1 to 30 parts by weight, preferably 5 to 30 parts by weight, of the hydrogenated resin.

Hydrogenated aliphatic petroleum resins or a small amount of paraffin wax may be mixed in the above composition. It is needless to mention that various additives, including antistatic agents, processing stabilizers, pigments, and the like, can be formulated into the composition.

The polypropylene resin composition can be formed into a film according to a known method. Most usually, the film is formed by uni- or bi-axial orientation. It is desirable to submit the film thus prepared to a corona discharge treatment.

The polypropylene resin composition thus obtained, when processed into a film, produces a product having superior heat-sealability, anti-blocking property, mechanical properties and printing performances, and, at the same time, exhibiting excellent transparency. Such a film can find wide applications for packing uses.

DESCRIPTION OF THE PREFERRED EMBODIMENT

The invention is hereinafter described by way of examples, which are, however, not intended as limiting the scope of this invention.

Films prepared in the examples below were evaluated according to the following methods.

Heat-sealability: Two sheets of films were pressed under a load of 1 Kg/cm$^2$ at 140° C. for 0.5 second using a bar-type heat sealer. Then, T-type break away was performed using a Schopper-type tensile tester on sample film with a 20 mm width at a rate of 200 mm/min to measure the force necessary to bring the break away (g/20 mm).

Blocking tendency: Two sheets of rectangular films (2 cm × 10 cm) were overlapped for the length of 2 cm with a load of 1 Kg/4 cm$^2$ at 40° C. for 24 hours. The force required for separation of the overlapped portion (Kg/4 cm$^2$) was measured by a tensille tester.

Haze: Measured by a method according to ASTM D-1003.

EXAMPLE 1

This example is not within the scope of this invention and is shown for comparison purpose.

Six hundred (600) g of a cyclopentadiene (CPD) fraction which is obtained from steam cracking of naphtha and contains 76.7% by weight of dicyclopentadiene, with the balance being comprised of a small amount of olefins and major proportion of saturated hydrocarbons (That is, this fraction contains cyclopentadienes in the amount of 7.0 moles calculated as cyclopentadiene.), and 400 g of xylene, as a solvent, were thermally polymerized in a nitrogen atmosphere at 260° C. for 3 hours. After removal of inert components in the raw material and unreacted raw material from the reaction mixture at 194° C., a second-stage polymerization was conducted under a reduced pressure of 50 Torr for 1 hour at the same temperature to produce 382 g of a resin with a softening point of 110° C. The resin had an ND/CD ratio of 0.44.

Immediately after production, the resin was dissolved into equal amount by weight of cyclohexane, and 2% by weight based on the resin of a nickel catalyst (Nikki Chemical Co., Ltd., N-113) was added to the solution. Hydrogenation was carried out on this mixture at 250° C. and under hydrogen pressure of 70 Kg/cm$^2$ (G) for 7 hours. The degree of hydrogenation was 98.8% and the hydrogenated resin obtained had a softening point of 129° C.

EXAMPLE 2

This example is not within the scope of this invention and is shown for comparison purpose.

Five hundred (500) g of the cyclopentadiene fraction as used in Example 1 (containing 5.8 moles as cyclopentadiene) and 500 g of a C$_9$ fraction obtained by steam cracking of naphtha and containing styrene, o-, m , and p-vinyl toluenes, α- and β-methyl styrenes and indenes in the total amount of 26.5% by weight (average molecular weight: 118) with the balance being inert aromatic hydrocarbons (That is, this fraction contains 1.1 moles of reactive components.), were copolymerized at 260° C. for 3 hours in a nitrogen atmosphere. After removal of inert components in the raw materials and unreacted raw materials at 238° C., the reaction mixture was maintained at 238° C. under a reduced pressure of 50 Torr for 1 hour to effect the second-stage polymerization to produce 450.4 g of a resin with a softening point of 127° C. The resin had an ND/CD ratio of 0.35.

Then, the resin was submitted to hydrogenation for 12 hours under the same conditions as in Example 1. The hydrogenated resin obtained had a softening point of 137° C. The degree of hydrogenation was 97.7%.

EXAMPLE 3

This example is not within the scope of this invention and is shown for comparison purpose.

Thermal polymerization was carried out in the same conditions as used in Example 2 on the mixture of 700 g of the same cyclopentadiene fraction used in Example 1 (containing 8.1 moles as cyclopentadiene) and 300 g of the same C$_9$ aromatic hydrocarbon fraction as used in Example 2 (containing 0.67 mole of reactive components). After removal of inert components in the raw materials and unreacted raw materials at 195° C., the reaction mixture was maintained at 195° C. under a reduced pressure of 50 Torr for 1 hour to effect the second-stage polymerization to produce 620 g of a resin with a softening point of 116° C. The resin had an ND/CD ratio of 0.58.

The resin was submitted to hydrogenation for 12 hours under the same conditions as in Example 1. The hydrogenated resin obtained had a softening point of 122° C. The degree of hydrogenation was 98.1%.

EXAMPLE 4

Thermal polymerization was carried out on the same raw materials as used in Example 2 under the same conditions as in Example 2. After removal of inert components in the raw materials and unreacted raw materials at 231° C., the second-stage polymerization was performed on the reaction mixture at 231° C. under a reduced pressure of 50 Torr for 1 hour to produce 451 g of a resin with a softening point of 107° C. The resin had an ND/CD ratio of 0.53.

The resin was submitted to hydrogenation or 15 hours under the same conditions as in Example 1 to obtain a hydrogenated resin with a softening point of 128° C. The degree of hydrogenation was 98.2%.

EXAMPLE 5

The thermally polymerized resin prepared in Example 2 was hydrogenated in the same manner as in Example 1, except that the hydrogenation reaction was continued for 18 hours in this Example. A hydrogenated resin with a softening point of 137° C. and the degree of hydrogenation was 98.8% was produced.

EXAMPLE 6

Seven hundred (700) g of the cyclopentadiene fraction used in Example 1 (containing 8.1 moles as cyclopentadiene). and 300 g of the $C_9$ fraction used in Example (reactive components: 0.67 mole), were copolymerized at 280° C. for 2 hours. After removal of unreacted materials and the like at 180° C., the second-stage polymerization was effected on the polymeric compound at 180° C. under a reduced pressure of 50 Torr for 1 hour to produce 698 g of a resin with a softening point of 121° C. The resin had an ND/CD ratio of 0.19.

The resin was hydrogenated in the same manner as in Example 4 to obtain a hydrogenated resin with a softening point of 128° C. The degree of hydrogenation was 98.6%.

EXAMPLE 7

Five hundred (500) g of the cyclopentadiene fraction used in Example 1 (containing 5.8 moles as cyclopentadiene), and 500 g of a fraction containing 48.6% by weight of reactive aromatic hydrocarbons, i.e., styrene etc. (average molecular weight of the reactive components: 109; reactive components: 2.2 moles), which is obtained by distillation of the $C_9$ fraction used in Example 2, were copolymerized in the same manner as in Example 2. After removal of inert components and unreacted raw materials at 280° C., the resulting polymeric compound was further treated at 280° C. under a reduced pressure of 50 Torr for 1 hour to produce 450 g of a resin with a softening point of 135° C. and an ND/CD ratio of 0.13.

The resin was hydrogenated in the same manner as in Example 4 to obtain a hydrogenated resin with a softening point of 139° C. The degree of hydrogenation was 98.8%.

Polypropylene resin compositions were prepared using 10 parts by weight of the hydrogenated resins prepared in Examples and 90 parts by weight of polypropylene (Specific gravity is 0.9 and MI is 2.), respectively. Bi-axial orientation was performed on each of the compositions according to a conventional method to obtain films. The characteristics measured on these films are shown in Table 1, which demonstrates that the films prepared from the compositions of the present invention have satisfactory characteristics, exhibiting, in particular, superior transparency (haze). A film prepared from polypropylene alone, which does not contain any one of hydrogenated resins prepared in the Examples, had a haze of 2.0.

TABLE 1

| | Examples No. | | | | | | |
|---|---|---|---|---|---|---|---|
| | 1 | 2 | 3 | 4 | 5 | 6 | 7 |
| Resin Composition | | | | | | | |
| Hydrogenated resin (wt. parts) | 10 | 10 | 10 | 10 | 10 | 10 | 10 |
| Polypropylene (wt. parts) | 90 | 90 | 90 | 90 | 90 | 90 | 90 |
| Characteristics of film | | | | | | | |
| Heat-sealability (g/20 mm) | 160 | 190 | 190 | 185 | 190 | 180 | 205 |
| Blocking (Kg/4 cm$^2$) | 0.1 | 0.1 | 0.1 | 0.1 | 0.1 | 0.1 | 0.1 |
| Haze (%) | 2.4 | 1.8 | 2.1 | 1.4 | 1.0 | 1.1 | 0.8 |

Example 1 represents an example of a hydrogenated resin produced without using aromatic hydrocarbons, and Example 2 represents an example of a resin wherein the copolymerized resin meets the requirement with respect to ND/CD ratio, but was not hydrogenated to a sufficient degree. On the other hand, the resin of Example 3 has a high degree of hydrogenation, but does not satisfy the requirement relative to ND/CD ratio. All polypropylene films prepared from these resins had inferior transparency. The copolymerized resin of Example 4 has an ND/CD ratio and a degree of hydrogenation both falling within the range defined in this invention. The values, however, are close to the boundary of the range, and thus the degree of the improvement in the transparency of the film prepared using this resin was smaller than those obtained with the use of the resins prepared in Examples 5 to 7.

We claim:

1. A polypropylene resin composition for manufacture of polypropylene film having excellent transparency comprising:
   (A) 70 to 99 parts by weight of stereospecific polypropylene and
   (B) 1 to 30 parts by weight of a hydrogenated resin, said hydrogenated resin being obtained by hydrogenation of a thermally copolymerized resin prepared from 1 mole of cyclopentadienes and 0.06 to 0.6 mole of one or more kinds of aromatic hydrocarbons selected from the group consisting of monovinyl aromatic hydrocarbons and indenes, wherein (a) said thermally copolymerized resin contained norbornene units (ND) and cyclopentene units (CD), both derived from cyclopentadiene units contained in said thermally copolymerized resin, in a ratio (ND/CD) of not higher than 0.55, and (b) the degree of hydrogenation of said hydrogenated resin is not less than 98.0%.

2. The resin composition of claim 1, wherein said degree of hydrogenation is not less than 98.5%.

3. The resin composition of claim 1, wherein said hydrogenated resin has a ring and ball method softening point of 80° to 155° C.

4. The resin composition of claim 1, wherein said resin composition contains 70 to 95 parts by weight of said polypropylene and 5 to 30 parts by weight of said hydrogenated resin.

5. The resin composition of claim 1, wherein said aromatic hydrocarbons have an average molecular weight of 104 to 144.

6. The resin composition of claim 1, wherein said thermally copolymerized resin is prepared by a two-stage thermal polymerization process.

7. The resin composition of claim 6, wherein the first-stage thermal polymerization is conducted at a temperature of 220° to 320° C. for 0.1 to 10 hours under a sufficient pressure to keep the polymerization system in a liquid phase.

8. The resin composition of claim 6, wherein the second stage thermal polymerization is conducted at a temperature of 150° to 300° C. for 0.5 to 10 hours under a reduced pressure to an increased pressure.

9. The resin composition of claim 1, wherein said hydrogenation is conducted in the presence of a hydrogenation catalyst at a temperature of 150° to 300° C. under a hydrogen pressure of 10 to 150 Kg/cm$^2$.

10. The resin composition of claim 9, wherein said hydrogenation catalyst is a metal of Group VIII of Periodic Table.

11. The resin composition of claim 3, wherein said thermally copolymerized resin is prepared by a two-stage thermal polymerization process.

12. The resin composition of claim 11, wherein the first-stage thermal polymerization is conducted at a temperature of 220° to 320° C. for 0.1 to 10 hours under a sufficient pressure to keep the polymerization system in a liquid phase, and the second-stage thermal polymerization is conducted at a temperature of 150° to 300° C. for 0.5 to 10 hours under a reduced pressure to an increased pressure.

13. The resin composition of claim 12, wherein said hydrogenation is conducted in the presence of a hydrogenation catalyst of Group VIII metal of periodic Table at a temperature of 150° to 300° C. under a hydrogen pressure of 10 to 150 Kg/cm$^2$.

14. The resin composition of claim 2, wherein said hydrogenated resin has a ring and ball method softening point of 80° to 155° C. and wherein said resin composition contains 70 to 95 parts by weight of said polypropylene and 5 to 30 parts by weight of said hydrogenated resin.

15. The resin composition of claim 14, wherein said aromatic hydrocarbons have an average molecular weight of 104 to 144.

16. The resin composition of claim 13, wherein said hydrogenated resin has a ring and ball method softening point of at least 115° C.

17. The resin composition of claim 14, wherein said hydrogenated resin has a ring and ball method softening point of at least 115° C.

18. The resin composition of claim 3, wherein said hydrogenated resin had a ring and ball method softening point of at least 115° C.

* * * * *